July 17, 1934.  E. B. BOUGHTON  1,966,750
BRAKE
Filed March 23, 1933

INVENTOR
E. B. Boughton
By
Atty.

Patented July 17, 1934

1,966,750

UNITED STATES PATENT OFFICE 1,966,750

BRAKE

Edward Bishop Boughton, London, England, assignor of one-half to Lockheed Hydraulic Brake Company Limited, London, England Application March 23, 1933, Serial No. 662,341
In Great Britain May 2, 1932

4 Claims. (Cl. 188—78)

This invention relates to brakes, and in particular to those of motor road vehicles in connection with which, as is well known, it sometimes occurs that when the brakes are applied, the various elements thereof develop chatter or vibration which produces an unpleasant sound. The present invention has for an object to provide improvements in brakes whereby such vibration may be prevented or, at least, damped out or neutralized to a large extent.

According to the invention, a brake element, such as a shoe, comprises two complementary or similar sections, adapted to be placed side by side in frictional contact with one another to co-operate together with a brake drum; said two section shoe being so connected with the brake actuating mechanism that, when the brake is applied, relative movement of the two sections is permitted under the control of the frictional contact therebetween.

As a result, vibrational movement of the brake element will be prevented, or damped out, for, upon vibration of one section, said section will tend via the spring frictional contact between it and the other section, to impart such movement to said other section which latter will have a damping effect upon the movement of the first section.

Figure 1:
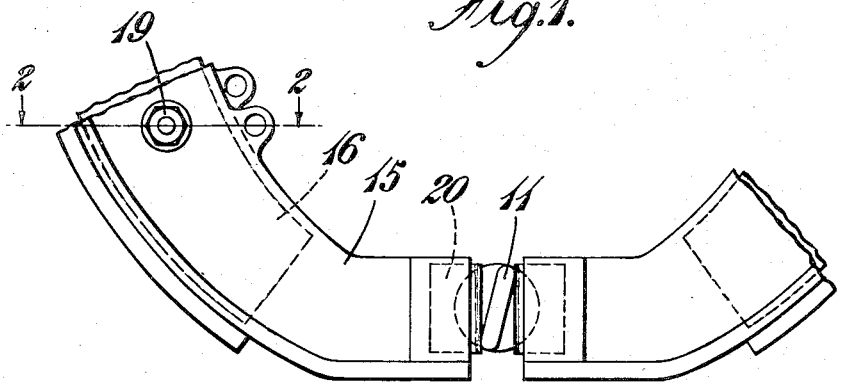
Figure 2:
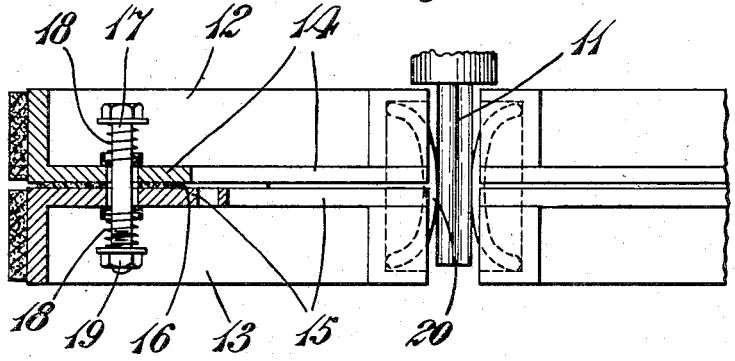

An arrangement according to one form of the invention is illustrated by the accompanying drawing, of which:

Figure 1 is a fragmentary view showing in side elevation portions of two shoes with the operating cam; whilst Figure 2 is a corresponding plan view, partly in section, on the line 2—2 of Figure 1.

As shown, each brake shoe operated by a cam 11 of usual form is formed in two sections 12 and 13 placed side by side with inwardly extending flanges 14 and 15 thereof adjacent to one another. Between the two flanges 14 and 15, however, there is placed an arcuate strip 16 of friction material, the two sections of each shoe being retained together by one or more pins such as those shown at 17 extending through oversize holes therein and having passed over each end thereof a coiled compression spring such as those indicated at 18, a nut 19 maintaining the spring pressure with which the flanges 14 and 15 of the two shoe sections 12 and 13 bear against one another.

Any known or convenient means may be provided for moving the two section shoe into co-operation with a brake drum provided this will permit of the required movement of the one section in relation to the other. In the form shown the brake operating member of cam 11 co-operates with a rigid bridge member 20 which, as will be seen, bears intermediately of its length upon the cam 11 and, at its ends, is received in recesses in the brake shoe sections 12 and 13 so as to be capable of rocking or rolling movement as the shoe sections 12 and 13 move in relation to one another.

In some cases, one section of a brake element may have a greater mass or weight than the other, in which event the lighter will be disposed where there is the greatest tendency to vibration.

It will be observed that there are various other ways in which the two sections of an element of a brake according to the invention may be maintained in the necessary frictional contact one with the other and whereby they may together be shifted towards the drum in the operation of the brake without interfering with their movement relatively to one another.

It is found that with an arrangement according to the invention, vibrational movement of the brake element as a whole will be prevented or damped out for a movement of one section tends to impart similar movement to the other with consequent resistance to the movement of the one and substantial elimination of the undesirable chatter or vibration at present so commonly experienced.

What I claim is:—

1. A brake element comprising two substantially similar sections each section including a flat bearing surface, with the flat bearing surfaces having frictional contact in the use of the element, and spring means to maintain the flat bearing surfaces under relative pressure toward each other in use.

2. A brake element comprising two substantially similar sections each section including a flat bearing surface, with the flat bearing surfaces arranged adjacent each other, a friction lining between said bearing surfaces, each of said bearing surfaces being formed with oversized holes to receive relatively reduced through pins, and springs on the ends of the pins beyond each bearing surface, with means for holding the springs under compression.

3. A construction as defined in claim 1, together with actuating means including a cam cooperating with a rigid link bearing pivotally at its ends upon the two sections.

4. A construction as defined in claim 1, together with actuating member including a cam, and a rigid link bearing pivotally at its ends upon the two sections, the link bearing intermediate of its length upon the actuating member.

EDWARD BISHOP BOUGHTON.